Feb. 1, 1938.    R. P. DE VAULT    2,106,796
PEELER
Filed March 26, 1935
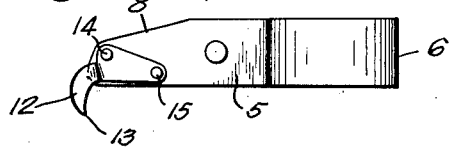
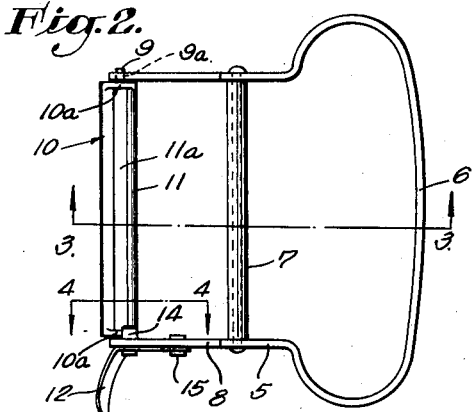
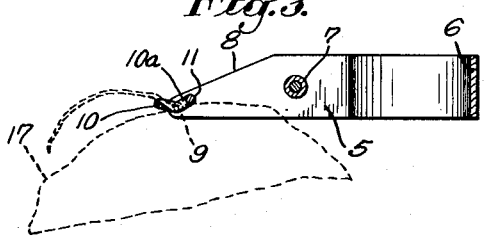
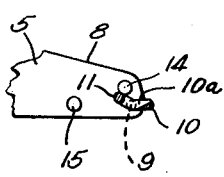
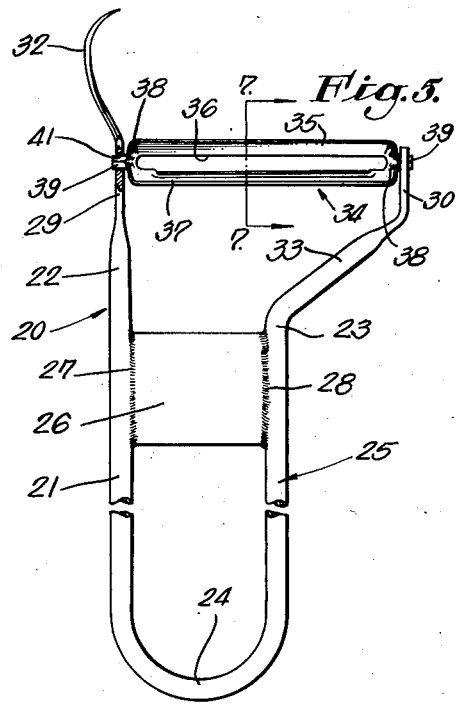
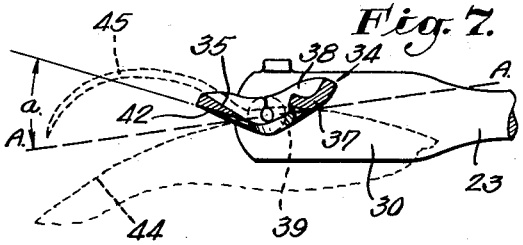
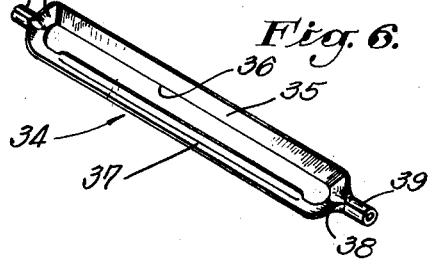
INVENTOR:
RALPH P. DE VAULT,
By Fred W. Lanire
ATTORNEY.

Patented Feb. 1, 1938

2,106,796

UNITED STATES PATENT OFFICE 2,106,796

PEELER

Ralph P. De Vault, South Pasadena, Calif.

Application March 26, 1935, Serial No. 13,025

16 Claims. (Cl. 30—280)

This invention relates to a device designed primarily for paring vegetables or fruit, such as potatoes, apples, pears, or the like.

An important object of the invention is to provide a device of this character including a pivoted blade so constructed that the blade, during the peeling or paring operation, will follow the contour of the article under treatment, to the end that the blade will move readily over irregularities on the surface of the article, thereby insuring against the blade cutting too deep, with the resultant waste.

A further object of the invention is to provide means on the body portion for cutting away the eyes of potatoes, or spoiled portions of the fruit or vegetables being prepared.

It is a further object of the invention to provide a device of the character set forth hereinabove in which the cutting blade is mounted for limited rotation and is provided with a guide strip or member spaced from the cutting edge in such a manner that the cutting edge of the blade will be held adjustably in a desired cutting relation to the surface of the vegetable or fruit to be peeled. A special feature of the device resides in the placing of the axis of partial rotation of the cutting blade in such position that a tendency for rotation of the blade will not be produced by the force which is applied thereto to move the same forwardly so as to produce a cutting action; therefore, either digging in of the blade or the swinging of the blade out of proper cutting engagement with the surface or skin of the fruit or vegetable will be avoided.

A further object of the invention is to provide a device of the above character which may be easily handled or manipulated so as to facilitate the peeling operation which it is designed to accomplish, and which device operates with noticeable ease and efficiency by reason of the provision therein of a very narrow blade. Also, by reason of the position of the handle with relation to the blade, a very noticeable ease and efficiency of operation is obtained, since the pressure or force for operating the knife is applied in substantial alignment with the cutting effect instead of to the side thereof.

Further objects and advantages of the invention will be made evident throughout the following part of the specification.

Referring to the drawing, which is for illustrative purposes only,

Fig. 1 is a side elevational view of a potato peeler constructed in accordance with the invention.

Fig. 2 is a plan view thereof.

Fig. 3 is a sectional view taken on the longitudinal line 3—3 of Fig. 2.

Fig. 4 is a sectional view taken on the line 4—4 of Fig. 2.

Fig. 5 is a plan view of another form of my invention in which the handle is made from round bar stock.

Fig. 6 is a perspective view of the knife member shown in Fig. 5.

Fig. 7 is an enlarged sectional view taken as indicated by the line 7—7 of Fig. 5, this view showing the manner in which force is applied to move the blade member forwardly to perform a cutting operation.

The form of the invention shown in Figs. 1 to 4 of the drawing includes a handle or body portion which may be readily formed from strip stock, this body portion comprising parallel leg members or cutter supports 5 which are connected by a handle portion 6. The leg members are preferably held in spaced relation and essentially parallel by the use of a brace rod 7 which is shown with its ends connected to the leg members 5.

As clearly shown in Figs. 1 and 3, the forward upper edges of the leg members 5 may be cut away at 8, and the ends of the leg members 5 are provided with openings 9a to receive pins or trunnions 9 which extend from a narrow blade 10. These pins 9, projecting into the openings 9a, support the blade 10 in such a manner that it may have limited rotation while in use, as will be hereinafter described. The blade 10 is connected to the pins 9 by means of end walls 10a which extend rearwardly, or rightwardly, and connect to the ends of a rod 11 which is spaced from the blade 10 so as to leave a slot or opening 11a.

The blade 10 is arranged at an oblique angle with respect to the rod 11 so that when the blade 10 and the rod 11 are applied to the surface of an article 17 to be peeled, as shown in Fig. 3, the cutting edge of the blade 10 will be directed not only forwardly in the direction of the cut to be taken but also downwardly at such an angle that the cutting edge of the blade will cut into the surface of the article 17 which is to be peeled.

The axis of partial rotation defined by the pins 9 is disposed between the cutting edge of the blade 10 and the lower portion of the rod 11. Accordingly, when the peeling device is moved forwardly, in this instance rightwardly, the motivating force which is applied on the axis defined by the pins 9 will be essentially directly ahead of the cutting edge so that there will be no forces acting as the result of the application of the cutting force to swing the cutting edge upwardly or downwardly above or below the forward line of movement. Therefore, the cutting member comprised of the blade 10 and the rod 11 will rest against the surface of the article 17 without the necessity for application of a heavy downward pressure.

From the foregoing, it will be seen that due to the construction shown and described, the blade will be guided in its operation, so that the blade will operate at a predetermined depth, and the paring will be of a uniform thickness, thus eliminating waste.

Extending laterally from one of the leg members is a blade indicated by the reference character 12, which blade has a pointed extremity 13 adapted to stick into the article under treatment, so that the eyes of potatoes, or spoiled portions of the vegetables or fruit being pared, may be readily removed. The blade 12 is secured to the body portion by means of rivets 14 and 15, the head of the rivet 14 extending inwardly an appreciable distance where it is engaged by the rod 11, restricting movement of the blade 10.

The form of the invention shown in Figs. 1 to 4 inclusive has a supporting structure consisting of the cutter supports 5 and the handle 6 made by bending a piece of ribbon metal to the desired form shown. In Fig. 5 I show a form of my invention in which the supporting member 20 is made from a length of bar stock 21 bent so as to form a pair of projecting legs 22 and 23, the rearward ends of the legs 22 and 23 being joined by a semi-circular bend 24. The handle 25 formed by bending the rod 21 in the manner described may be reinforced by securing a flat plate 26 between the intermediate portions of the legs 22 and 23. This flat plate may be soldered to the legs 22 and 23 at the points 27 and 28. The extreme ends 29 and 30 of the legs 22 and 23 are preferably flattened, as shown, to provide cutter supports lying on a line disposed in crossing relation to the longitudinal centerline or line of movement of the handle 25, and the end 29 is extended forwardly and is curved and sharpened as shown at 32 to form a trimming blade suitable for lifting out the eyes of potatoes, cutting out bad spots, etc. The forward portion of the leg 23 may be bent outwardly relative to the leg 22, as shown at 33, so that a space will be provided between the flattened portions 29 and 30 to receive a peeling knife or cutter 34 consisting of a cutting blade 35 having a cutting edge 36, and a guide bar 37 joined to the cutting blade 35 by means of end walls 38. From the end members 38 trunnions 39 extend through openings 41 in the flattened portions 29 and 30 of the legs 22 and 23. The knife 34 is preferably stamped from sheet metal, and the trunnions 39, as shown in Fig. 6, consist in extensions of the sheet metal which are rolled up to substantially tubular or cylindrical form. It will be noted that the knife 34, as best shown in Fig. 7, has the blade 35 and the guide bar 37 thereof disposed in angular relation to a plane A—A extending across the lower portions thereof. The lower face 42 of the blade 35 is disposed at an angle of approximately 22½° relative to the plane A—A, as indicated by the angle $a$ of Fig. 7. The axis of rotation defined by the trunnions 39 is disposed substantially on the plane A—A and in a position between the blade 35 and the bar 37 but closer to the cutting edge of the blade 35 than to the bar 37. In the form of the invention shown, the axis of rotation is substantially one-third the distance from the cutting edge to the bar 37. Accordingly, when the knife member 34 is placed against the surface of an article 44 which is to be peeled, both the blade 35 and the bar 37 will move into engagement with the surface of the article 44, and accordingly the cutting angle of the blade 35 will automatically assume the desired relation to the surface of the article 44, so that when the peeling device is moved in forward or rightward direction, as shown in Fig. 7, the blade 35 will cut into the article 44 and remove a strip of peel 45 therefrom. The line of pull which is along the centerline and is exerted through the handle 25 and the trunnions 39 to the blade 35 is substantially directly forwardly of the cutting edge of the blade 35, the result being that the cutting operation may be performed with a minimum pressure of the member 34 against the surface of the article 44.

It will be noted that the blade shown at 10 and 35 in the drawing is very narrow. I have found that an efficient peeling action may be accomplished by the use of this narrow blade by reason of the fact that the blade readily follows the contour of the article to be peeled. For example, a narrow blade of the character shown will readily drop into hollows and continue its peeling action, where a wide blade such as ordinarily employed will pass over such hollows, leaving spots unpeeled where the article must be later trimmed to remove the same. By "narrow" is meant a blade which has a width from two to five times its thickness. The members 35 and 37 are formed from a pair of bars extending in side by side relation and being supported in operative association by the connection of their ends with the end members 38. When the handle 25 is manually grasped and is manipulated so as to move the cutter member 34 along the longitudinal centerline or line of movement of the handle 25 and in engagement with the surface of the article to be peeled, the bar 37 will ride ahead of the blade 35 and guide the same over the contours of the article.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A paring device comprising a body portion embodying a length of metal bent intermediate its ends providing a handle and parallel leg members, a cutter pivotally mounted between the free end portions of the parallel leg members, said cutter embodying a pair of end members, a blade secured to the end members, a rod connecting the end members and disposed in spaced relation with the blade and providing a guide for the blade, and trunnions extending outwardly from said end members for pivotal engagement with said leg members, said trunnions being so positioned as to define an axis of rotation between the lower portions of said blade and said rod and lying substantially in the plane defined by the lower edges of said blade and said rod.

2. A paring device of the character described, comprising: a body including a handle member formed so as to be grasped in operative position in one of the hands of a user whereby it may be manually applied to an article to be peeled which is held in the other hand of the user, and a pair of spaced supports disposed on a line which lies in crossing relation to the center line of said handle member; and a cutter pivotally mounted between said spaced supports, said cutter embodying a pair of end members, a blade secured to the end members, a rod connecting the end members and disposed in spaced relation with the blade and providing a guide for the blade, and trunnions extending outwardly from said end members for pivotal engagement with said supports, said trunnions being so positioned as to define an axis of rotation between the lower portions of said blade and said rod.

3. A paring device of the character described, comprising: a body including a handle member and a pair of spaced supports; and a cutter pivotally mounted between said spaced supports, said cutter embodying a pair of end members, a blade secured to the end members, a rod connecting the end members and disposed in spaced relation with the blade and providing a guide for the blade, and trunnions extending outwardly from said end members for pivotal engagement with said supports, said trunnions being so positioned as to define an axis of rotation between the lower portions of said blade and said rod and lying substantially in the plane defined by the lower edges of said blade and said rod.

4. A paring device of the character described, including: a knife member comprising a guide bar, a knife blade substantially parallel to said guide bar with the cutting edge thereof facing toward said guide bar, and pivot means connected to the adjacent ends of said guide bar and said knife blade; a supporting member providing a pair of supports in spaced relation and engaging said pivot means so that said knife member will be pivotally supported thereby; a handle extending from said supporting member on a line which crosses the line defined by the cutting edge of said knife blade, said handle member being formed so as to be grasped in operative position in one hand of the user whereby it may be manually moved across an article to be peeled held in the other hand of the user; and stop means for limiting the rotation of said knife member.

5. A paring device of the character described, comprising: a body including a handle member and a pair of spaced supports; and a cutter pivotally mounted between said spaced supports, said cutter embodying a pair of end members, a blade secured to the end members, a rod connecting the end members and disposed in spaced relation with the blade and providing a guide for the blade, and trunnions extending outwardly from said end members for pivotal engagement with said supports, said trunnions being so positioned as to define an axis of rotation between the lower portions of said blade and said rod and lying substantially in the plane defined by the lower edges of said blade and said rod.

6. A cutter member for a paring device of the character described, including: a pair of end members; a blade secured to the end members; a rod connecting the end members and disposed in spaced relation with the blade and providing a guide for the blade; and trunnions extending outwardly from said end members for pivotal engagement with supports, said trunnions being so positioned as to define an axis of rotation between the lower portions of said blade and said rod and lying substantially in the plane defined by the lower edges of said blade and said rod.

7. A peeler blade of the character described, comprising: a metal stamping having the form of an elongated loop consisting of a pair of oppositely disposed end members and a blade member and a guide bar in parallel relationship, the ends of said blade member and guide bar being joined to said end members, and there being trunnion members projecting from said end members, said trunnion members each consisting of a portion of the metal stamping rolled up so as to form a tubular element.

8. A peeler blade of the character described, comprising: a metal stamping having the form of an elongated loop consisting of a pair of end members curved transversely to the length of said metal stamping, and a blade member and a guide bar disposed in parallel relationship, the ends of said blade member and said guide bar being joined to said end members and there being trunnions projecting from said end members, said trunnions each consisting of a portion of the metal stamping rolled up so as to produce a trunnion having a diametral dimension greater than the thickness of the metal stamping.

9. A peeler blade of the character described, comprising: a metal stamping having the form of an elongated loop consisting of a pair of oppositely disposed end members and a blade member and a guide bar in parallel relationship, the ends of said blade member and said guide bar being joined to said end members, and there being trunnion members projecting from said end members, said trunnion members each consisting of a projecting portion of the metal stamping deformed so as to produce a trunnion member of greater diametral dimension than the thickness of the metal from which said stamping is formed.

10. A peeler blade of the character described, comprising: a metal stamping having the form of an elongated channel with a longitudinal slot along the bottom thereof and providing an elongated loop consisting of a pair of end members extended transversely to the length of said metal stamping and a blade member and guide bar disposed in parallel relationship, the ends of said blade member and said guide member being joined to said end members and said end members being formed so as to provide pivot means for said peeler blade.

11. A rotatable cutter member of the character described adapted to be secured between spaced supports of a handle member, including: a pair of end members; a blade connecting said end members; and a rod connecting the end members and being disposed in spaced relation to said blade so as to form a guide therefor, there being pivot means for connecting said end members to said spaced supports of said handle member, said pivot means defining an axis of rotation between the lower portions of said blade and said rod and lying substantially in the plane defined by the lower edges of said blade and said rod.

12. A rotatable cutter member of the character described adapted to be secured between spaced supports of a handle member, including: a stamping forming an elongated loop having a pair of parallel bars and end portions connecting the adjacent ends of said bars, one of said bars forming a guide for the other of said bars, and said other bar being sloped downwardly toward said guide bar and having the lower edge thereof sharpened to form a cutting edge, there being means for connecting said end portions of said stamping to said spaced supports of said handle member, said pivot means defining an axis of rotation disposed between the lower portions of said parallel bars.

13. A rotatable cutter member of the character described adapted to be secured between spaced supports of a handle member, comprising: a stamping forming an elongated loop having a pair of parallel bars and end portions connecting the adjacent ends of said bars, said bars sloping downwardly toward each other so that said stamping will have the shape of a channel with a slot in the bottom thereof, one of said bars forming a guide for the other of said bars and the other of said bars having its lower edge sharpened so as to form a cutting edge, there being means for pivotally connecting said end portions of said stamping to said spaced supports of said handle member.

14. A rotatable cutter member of the character described adapted to be secured between spaced supports of a handle member, comprising: a stamping comprising an elongated channel having a slot in the bottom thereof between a pair of parallel longitudinal bars, the lower edge of one of said bars being sharpened to form a cutting edge and the other of said bars serving as a guide for said first named bar, the ends of said stamping being formed so as to provide pivotal connection of said stamping with said spaced supports of said handle member.

15. A paring device of the character described, comprising: a body forming a handle member shaped so as to be grasped in one hand of the user in such position that the paring device may be moved across an article to be peeled held in the other hand of the user, said handle member having a pair of spaced supports lying on a line disposed in crossing relation to the longitudinal centerline of said handle member; and a cutter member pivotally mounted between said supports, said cutter member embodying a pair of end members, a blade connecting said end members, and a bar connecting said end members in spaced relation to said blade and forming a guide therefor, said end members being formed so as to provide pivotal connection of said cutter member with said supports.

16. A paring device of the character described, comprising: a handle member formed so as to be grasped in one hand of the user and to be thereby moved across an article to be peeled, said handle member having a pair of spaced supports lying on a line disposed in crossing relation to the longitudinal centerline of said handle member; and a cutter member disposed between said supports, said cutter member consisting of a stamping in the form of a channel having a longitudinal slot in the bottom thereof between a pair of bars, the lower edge of one of said bars being sharpened to form a cutting edge and the other of said bars constituting a guide for said first named bar, the end portions of said stamping being formed so as to provide pivotal connection of said cutter member with said spaced supports of said handle member.

RALPH P. DE VAULT.